United States Patent
Mazur et al.

(10) Patent No.: US 6,502,386 B1
(45) Date of Patent: Jan. 7, 2003

(54) CATALYST MONITORING IN A DIESEL ENGINE

(75) Inventors: Christopher John Mazur, Canton, MI (US); Karen M Adams, Ann Arbor, MI (US); Paul Matthew Laing, Canton, MI (US); Robert Henry Hammerle, Franklin, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/631,135

(22) Filed: Aug. 2, 2000

(51) Int. Cl.[7] .................................................. F01N 3/00
(52) U.S. Cl. .............................. 60/277; 60/274; 60/276
(58) Field of Search ......................... 60/274, 277, 285, 60/276

(56) References Cited

U.S. PATENT DOCUMENTS

| | | | |
|---|---|---|---|
| 3,998,095 A | | 12/1976 | Tinkham et al. |
| 4,089,310 A | * | 5/1978 | Noguchi et al. ............... 60/276 |
| 4,175,427 A | | 11/1979 | Blanke |
| 5,259,189 A | * | 11/1993 | Baier et al. .................... 60/277 |
| 5,408,215 A | | 4/1995 | Hamburg |
| 5,410,873 A | * | 5/1995 | Tashiro ......................... 60/285 |
| 5,426,934 A | * | 6/1995 | Hunt et al. .................... 60/277 |
| 5,444,974 A | | 8/1995 | Beck et al. |
| 5,509,267 A | | 4/1996 | Theis |
| 5,822,979 A | * | 10/1998 | Hamburg et al. ............. 60/277 |
| 5,839,274 A | * | 11/1998 | Remboski et al. ............ 60/277 |
| 5,876,680 A | | 3/1999 | Chattha et al. |
| 5,896,743 A | * | 4/1999 | Griffin .......................... 60/277 |
| 5,939,037 A | | 8/1999 | Hepburn et al. |
| 5,941,918 A | | 8/1999 | Blosser |
| 5,953,905 A | | 9/1999 | Jerger et al. |
| 5,970,706 A | * | 10/1999 | Williamson et al. .......... 60/276 |
| 6,003,303 A | | 12/1999 | Peter-Hoblyn et al. |
| 6,018,944 A | * | 2/2000 | Davey et al. .................. 60/277 |
| 6,092,368 A | * | 7/2000 | Ishii et al. ..................... 60/277 |
| 6,161,428 A | * | 12/2000 | Esteghlal et al. ............. 60/277 |
| 6,202,406 B1 | * | 3/2001 | Griffin et al. ................. 60/285 |
| 6,209,313 B1 | * | 4/2001 | Wissler et al. ................ 60/286 |
| 6,209,316 B1 | * | 4/2001 | Duvinage et al. ............. 60/285 |

* cited by examiner

Primary Examiner—Thomas Denion
Assistant Examiner—Diem Tran
(74) Attorney, Agent, or Firm—Julia Voutyras; Allan Lippa

(57) ABSTRACT

A carbon monoxide sensor placed downstream of the catalytic converter and a temperature sensor placed upstream of the converter in a diesel engine provide information to build a real time CO conversion efficiency versus catalyst temperature curve to determine whether a catalyst has deteriorated beyond a predetermined point with respect to On-Board Diagnostic (OBD) requirements. Pre catalyst CO concentration is inferred from the engine operating conditions, and catalyst temperature is determined using the temperature sensor output and the engine exhaust flow heat transfer model. The real time curve is compared to a reference curve to determine catalyst performance. Catalyst performance with respect to CO conversions can then be correlated to that for HC and $NO_x$ to meet OBD requirements.

18 Claims, 2 Drawing Sheets

CATALYST MONITORING IN A DIESEL ENGINE

FIELD OF INVENTION

This invention relates to systems and methods for monitoring the performance of a catalytic converter in diesel engines, and more particularly to the use of a carbon monoxide sensor to achieve this goal.

BACKGROUND OF THE INVENTION

Vehicles equipped with diesel engines offer ecological and economical advantages compared to those equipped with conventional gasoline engines due to their higher fuel economy benefit. However, both diesel and gasoline engines discharge pollutants, such as carbon monoxide (CO), hydrocarbons (HC), nitrogen oxides ($NO_x$), and particulate matter. Catalytic converters are used to reduce pollutants. These devices are typically installed in the exhaust system of the engine. As the catalytic converter ages, its ability to reduce combustion by-products, i.e. its conversion efficiency, diminishes.

Government agencies are requiring vehicles to be equipped with emission monitoring systems, commonly known as On-Board Diagnostic (OBD) systems, in order to inform the operator of the vehicle when the emissions exceed government allowed standards. It is required that the malfunction indicator light be turned on when levels of specific emissions exceed the standard by a designated factor. Current OBD requirements are targeted primarily at HC and $NO_x$ emissions. Therefore, in order to comply with the OBD requirements, it is important to monitor the performance of the catalytic converter.

One method of determining degradation in catalytic converter efficiency is described in U.S. Pat. No. 5,822,979. A sensor providing a signal indicative of the HC concentration of the exhaust gas is positioned downstream of the catalyst. The amount of energy that is transferred from the exhaust gas to the catalyst to achieve light-off is then calculated based on engine operating conditions. Light-off in this instance is defined as the point at which catalyst efficiency surpasses 50% for HC reduction. If the total energy input into the catalyst to achieve light-off is higher than a predetermined threshold value, it is inferred that the catalyst has deteriorated sufficiently to produce emission levels higher than allowed.

The inventors herein have recognized two disadvantages with this approach for vehicles equipped with diesel engines. First, monitoring HC emissions directly would not work on diesel engines. Since diesel emissions contain heavier, more condensable HC components than gasoline engine emissions, the heavy HC emissions can adsorb onto the catalyst at temperatures below light-off. Therefore, if HC levels are measured pre and post catalyst for diesel, it may appear that HC conversion is taking place when, in effect, the post catalyst HC reduction is due to it being stored on the catalyst. Thus, it is not possible to estimate catalyst efficiency in a diesel engine accurately by monitoring HC post catalyst. Second, catalysts on gasoline engines generally accumulate energy continuously as before and during light-off. They reach light-off temperatures in a short time after cold start. This is due to combination of high exhaust temperature and high levels of CO and HC. The latter produce enough of an exotherm to increase catalyst temperature for light-off, and maintain catalyst temperature well above light-off. In contrast, diesel catalysts usually dissipate much of the energy they adsorb before and after light-off. This is because of both low exhaust temperature and low levels of CO and HC. Diesel catalysts typically take much longer to achieve cold start light-off temperature than gasoline catalysts. Diesel catalysts will pass in and out of light-off, or partial light-off, in conjunction with accelerations and decelerations of the driving pattern. Therefore, using cumulative energy input to a catalyst to achieve light-off as a measure of performance will not work on diesel applications.

SUMMARY OF THE INVENTION

An object of the present invention is to provide a method and a system for improved monitoring of catalytic converter performance in vehicles equipped with diesel engines.

The above object is achieved and disadvantages of prior approaches overcome by a method for evaluating a performance of a catalytic converter, the converter coupled to a first sensor providing a first signal indicative of a catalytic converter temperature and coupled to a second sensor providing a second signal indicative of a concentration of an exhaust constituent exiting the catalytic converter, the method including the steps of: estimating a concentration of the exhaust constituent entering the catalytic converter based on operating conditions; calculating a conversion efficiency of the exhaust constituent based on said estimating and the second signal; creating a first table of said conversion efficiency versus the catalytic converter temperature; and determining whether the catalytic converter is operating below a predetermined efficiency level based on a mathematical comparison of said first table to a second table indicative of a threshold catalytic converter efficiency.

In an alternative embodiment, the above object is achieved and disadvantages of prior approaches overcome by a method for evaluating a performance of a catalytic converter in an internal combustion engine, the converter coupled to a first sensor providing a first signal indicative of a concentration of an exhaust constituent entering the catalytic converter and coupled to a second sensor providing a second signal indicative of a concentration of the exhaust constituent exiting the catalytic converter and coupled to a third sensor providing a third signal indicative of a catalytic converter temperature, the method including the steps of: calculating a conversion efficiency of the exhaust constituent based on the first and second signals; creating a first table of said conversion efficiency versus the catalytic converter temperature; and determining whether the catalytic converter is operating below a predetermined efficiency level based on a mathematical comparison of said first table to a second table indicative of a threshold catalytic converter efficiency.

In yet another aspect of the present invention, the above object is achieved an disadvantages of prior approaches overcome by a system for monitoring a performance of a catalytic converter with respect to a first exhaust constituent, the system consisting of: a diesel engine; a sensor providing a first signal indicative of a concentration of a second exhaust constituent entering the catalytic converter; a sensor providing a second signal indicative of a concentration of said second exhaust constituent exiting the catalytic converter; a sensor providing a third signal indicative of a catalytic converter temperature; and a controller for calculating a conversion efficiency of said second exhaust constituent based on said first and said second signals, determining a conversion efficiency of the first exhaust constituent based on a prestored table of the first exhaust constituent conversion efficiency vs. said second exhaust constituent conversion efficiency, and determining whether the catalytic converter is operating below a predetermined efficiency level with respect to the first exhaust constituent conversion efficiency.

An advantage of the above aspects of invention is that a more accurate estimate of catalytic converter performance in diesel engines can be achieved by monitoring pre and post catalyst carbon monoxide concentration rather than hydrocarbon concentration. Since current OBD requirements are targeted to HC and $NO_x$ emissions, the converter's performance with respect to CO can then be correlated to that for HC and $NO_x$. Also, the proposed method builds a carbon monoxide conversion rate versus temperature curve and compares it to a reference curve to evaluate catalyst performance. This method is more accurate than the prior art method which compares a single point performance to a single point on a reference curve. Having a more accurate estimate of the catalytic converter performance in diesel engines will allow stricter compliance to OBD requirements.

Other objects, features and advantages of the present invention will be readily appreciated by the reader of this specification.

BRIEF DESCRIPTION OF THE DRAWINGS

The object and advantages claimed herein will be more readily understood by reading an example of an embodiment in which the invention is used to advantage with reference to the following drawings herein:

DESCRIPTION OF THE INVENTION

Figure 1:
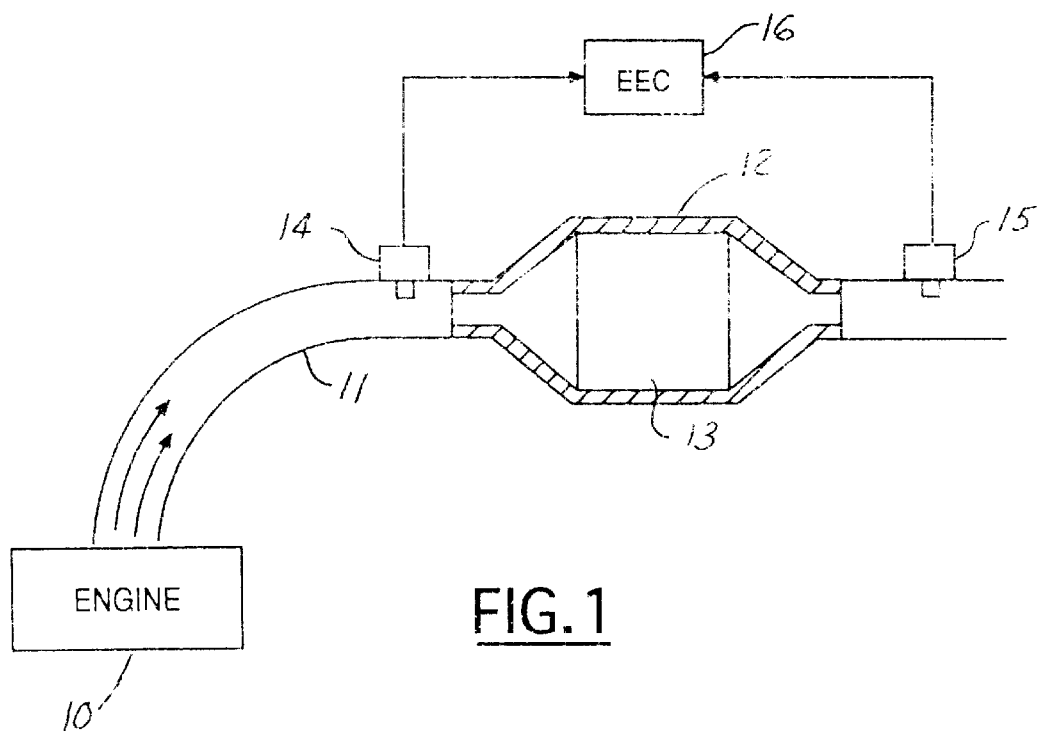
FIG. 1 is a block diagram of an engine and catalytic converter including a monitoring system in accordance with an embodiment of this invention.

Referring to FIG. 1, an example of an embodiment of the current invention is presented. Exhaust gas travels from the exhaust manifold 10 through the exhaust system 11 to a catalytic converter 12 containing a catalyst 13. Upstream of catalytic converter is a temperature sensor 14 providing a pre-catalyst temperature measurement to the electronic engine controller (EEC) 16. Downstream of the catalytic converter 12 is a CO sensor 15 providing the post catalyst CO concentration input to the EEC 16. In an alternative embodiment, a CO sensor providing the pre catalyst CO concentration input to the EEC could be positioned upstream of the catalytic converter.

Figure 2:
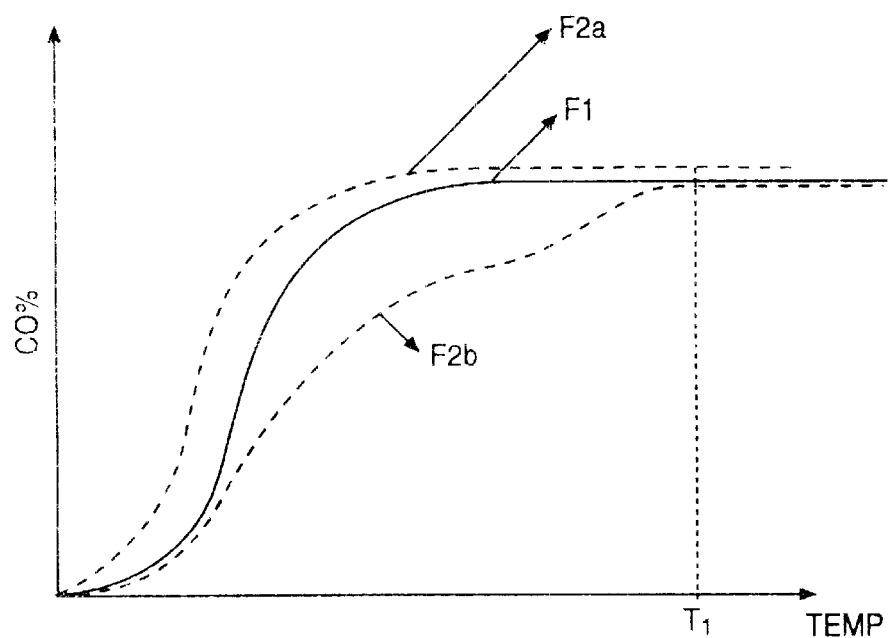
FIG. 2 is a graphical representation of carbon monoxide conversion rate of a catalytic converter versus converter temperature.

FIG. 2 shows graphically how the rate of CO conversion by the catalytic converter increases with catalyst temperature. F1 is the stored reference curve indicative of threshold catalytic converter efficiency. F2a is a real-time curve representative of a passing catalytic converter efficiency. F2b is a real-time curve representative of a degraded catalytic converter efficiency. All three of the example curves show a similar CO conversion rate once the catalyst temperature exceeds a predetermined temperature T1. T1 is usually determined by the properties of catalytic material used in the catalytic converter, and the size and shape of the converter.

Figure 3:
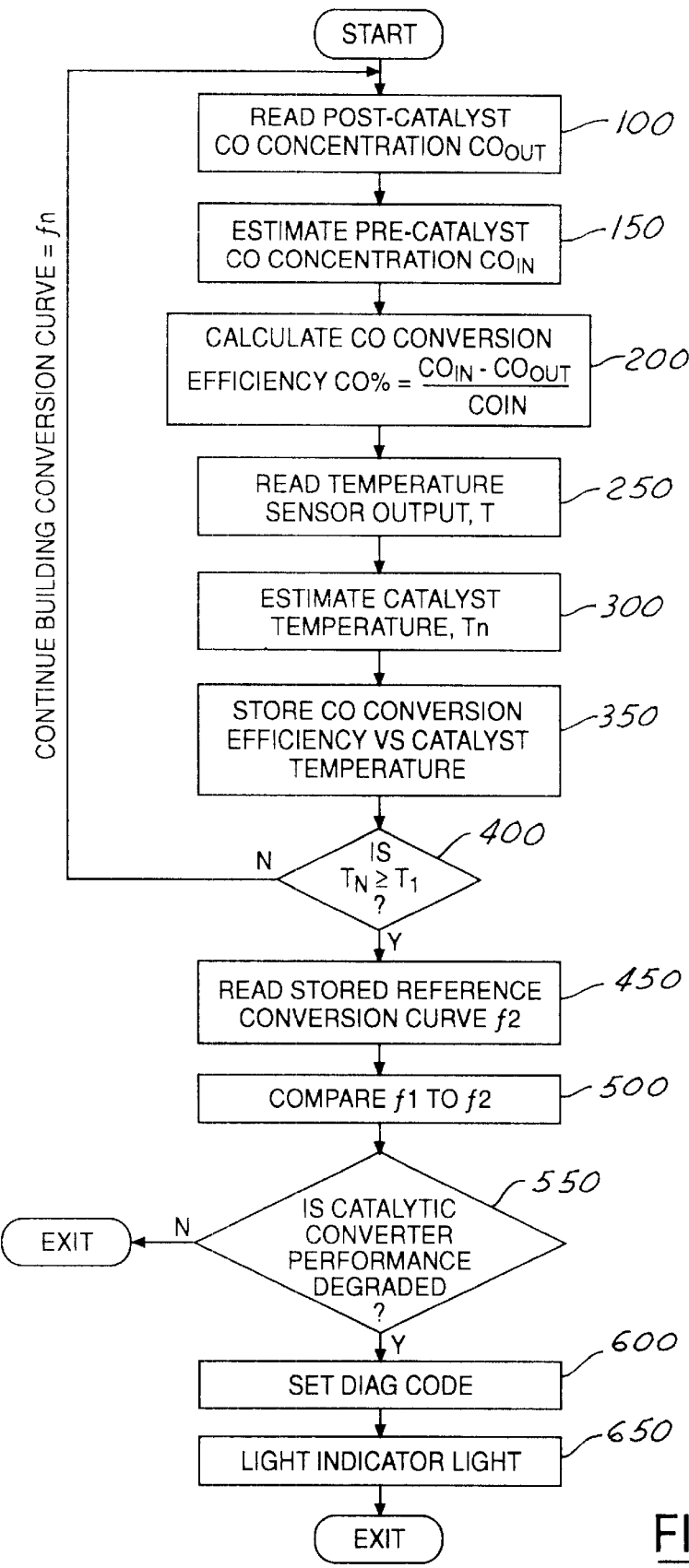
FIG. 3 is a flowchart for catalytic converter efficiency monitoring using a carbon monoxide sensor in accordance with an embodiment of this invention.

Referring now to FIG. 3, a routine is described for monitoring efficiency of the catalytic converter in a diesel engine by comparing a real-time CO conversion rate vs. catalyst temperature curve to a stored reference curve. First, in step 100 post catalyst CO concentration level $CO_{out}$ is provided by the post catalyst CO sensor. Next, in step 150 pre catalyst CO concentration level $CO_{in}$ is estimated based on engine operating conditions from a prestored CO concentration versus engine speed and load map. In an alternative embodiment, a pre catalyst CO sensor can be added to provide the $CO_{in}$ information. Moving on to step 200, CO conversion rate is calculated as a ratio of $[CO_{in}-CO_{out}]$ and $CO_{in}$. Next, in step 250 the temperature sensor output, T, is read. Logic flow then goes to step 300 where catalyst temperature $T_n$ is calculated based on T and the engine exhaust flow heat transfer model. Logic flow then goes to step 350 where a decision is made if the catalyst temperature $T_n$ calculated in step 300 is greater than or equal to a predetermined temperature constant T1 as discussed in FIG. 2. If the answer to step 350 is NO, the routine continues building the CO conversion vs. temperature curve and returns to step 100. If the answer to step 350 is YES, logic flow proceeds to step 400 where stored reference curve F1 is read, and then proceeds to step 450 where F1 is compared to the real time curve F2 created in steps 100–300. The logic flow then proceeds to step 500 where a decision is made if the catalyst converter performance is degraded (example curve F2b FIG. 2) or not degraded (example curve F2a FIG. 2). If the answer to step 500 is YES (i.e. catalytic converter performance is degraded) the routine moves on to step 550 whereupon a diagnostic code is set in the EEC, and then to step 600 whereupon an malfunction indicator light (MIL) is lit to alert the operator of the vehicle, and the routine exits. If the answer to step 500 is NO (i.e. catalytic converter performance is acceptable) the routine exits.

Thus, according to the present invention, the performance of the catalytic converter can be determined by real time monitoring of CO conversion rate versus catalyst temperature, and comparing this information to a reference curve. Degradation in the CO conversion rate can be correlated to degradation in the overall catalytic converter performance. Also, a table of CO conversion efficiency vs. HC conversion efficiency can be built from historical data. Therefore, once the CO conversion rate is determined, HC conversion rate can be inferred, and thus a determination can be made whether the catalytic converter efficiency meets OBD requirements with respect to HC emissions.

This concludes the description of the invention. Various modifications and variations will no doubt occur to those skilled in the art to which this invention pertains. Accordingly, it is intended that the scope of this invention be defined by the following claims

What is claimed is:

1. A method for monitoring a performance of a catalytic converter, comprising:

determining a conversion efficiency of the catalytic converter based on an amount of a carbon and oxygen carrying component in an exhaust gas mixture entering the converter and on an amount of said carbon and oxygen carrying component in an exhaust gas mixture exiting the converter;

generating a first measure of the catalytic converter performance based on not less than two of said conversion efficiency calculations performed at different operating temperatures of the converter, such temperatures extending to a predetermined temperature, such predetermined temperature being a temperature where the conversion efficiency for an aged catalytic converter and a new catalytic converter are substantially the same; and comparing said first measure to a second measure indicative of a threshold performance of the catalytic converter.

2. The method as set forth in claim 1 wherein said catalytic converter is coupled to a diesel engine.

3. The method as set forth in claim 2 wherein said carbon and oxygen carrying exhaust gas component is a carbon monoxide.

4. The method as set forth in claim 3 wherein said amount of carbon and oxygen carrying component of said exhaust gas mixture entering the converter is estimated based on operating conditions.

5. The method as set forth in claim 4 wherein estimation is based on engine speed and engine load.

6. The method as set forth in claim 1 wherein said amount of carbon and oxygen carrying component of said exhaust gas mixture entering the converter is determined based on an output of a sensor coupled upstream of the converter.

7. The method as set forth in claim 1 wherein said amount of carbon and oxygen carrying component of said exhaust gas mixture exiting the converter is determined based on an output of a sensor coupled downstream of the converter.

8. The method as set forth in claim 1 wherein said conversion efficiency is calculated as a ratio of a difference between said amount of said carbon and oxygen carrying component in said exhaust gas mixture entering the converter and said amount of said carbon and oxygen carrying component in said exhaust gas mixture exiting the converter, and said amount of said carbon and oxygen carrying component in said exhaust gas mixture entering the converter.

9. The method as set forth in claim 1 further comprising indicating that the performance of the catalytic converter is degraded based on a result of said comparing of said first measure to said second measure.

10. The method as set forth in claim 9 further comprising setting a diagnostic code in response to said indicating.

11. The method as set forth in claim 10 further comprising lighting an indicator light if said diagnostic code is set.

12. A system for monitoring a performance of a catalytic converter, the system comprising:

a diesel engine having the converter disposed in its exhaust passage;

a sensor coupled downstream of the converter, said sensor providing a signal indicative of an amount of carbon monoxide in an exhaust gas mixture exiting the catalytic converter; and a controller estimating an amount of carbon monoxide in an exhaust gas mixture entering the catalytic converter, and performing at least two calculations of a catalytic converter efficiency based on said estimating and said sensor signal, said calculations performed at different operating temperatures of the converter, such temperatures extending to a predetermined temperature, such predetermined temperature being a temperature where the conversion efficiency for an aged catalytic converter and a new catalytic converter are substantially the same.

13. The system as set forth in claim 12 wherein said controller further compares said calculations to a set of predetermined values indicative of threshold catalytic converter efficiencies at said operating temperatures.

14. The system as set forth in claim 13 wherein said controller further provides an indication of a converter degradation based on a result of said comparing.

15. The system as set forth in claim 12 wherein said controller estimates said carbon monoxide amount based on engine speed and engine load.

16. A system for monitoring a performance of a catalytic converter, the system comprising:

a diesel engine having the catalytic converter coupled downstream;

a sensor coupled upstream of the converter, said sensor providing a first signal indicative of a concentration of carbon monoxide in an exhaust gas mixture entering the catalytic converter;

a sensor coupled downstream of the converter, said sensor providing a second signal indicative of a concentration of carbon monoxide in an exhaust gas mixture exiting the catalytic converter; and a controller for calculating a catalyst conversion efficiency based on said first and said second signals and;

wherein said controller further generates a measure of converter performance based on not less than two said efficiency calculations performed at different operating temperatures of the converter, such temperatures extending to a predetermined temperature, such predetermined temperature being a temperature where the conversion efficiency for an aged catalytic converter and a new catalytic converter are substantially the same.

17. The system as set forth in claim 16 wherein said controller further provides an indication of converter degradation based on a comparison of said measure of converter performance and a baseline measure of converter performance.

18. The system as set forth in claim 17 wherein said controller further sets a diagnostic code in response to said indication.

* * * * *